(12) United States Patent
Allen et al.

(10) Patent No.: US 6,295,157 B1
(45) Date of Patent: Sep. 25, 2001

(54) THERMALLY BALANCED ACOUSTO-OPTIC MODULATOR

(75) Inventors: Paul C. Allen, Beaverton; Jerry Martyniuk, Portland, both of OR (US)

(73) Assignee: Etec Systems, Inc., Hayward, CA (US)

( * ) Notice: Subject to any disclaimer, the term of this patent is extended or adjusted under 35 U.S.C. 154(b) by 0 days.

(21) Appl. No.: 09/379,566

(22) Filed: Aug. 23, 1999

(51) Int. Cl.⁷ .................................. G02F 1/11; G02F 1/33
(52) U.S. Cl. .................................... 359/285; 359/305
(58) Field of Search ..................................... 359/285, 287, 359/288, 305, 312, 313, 314

(56) References Cited

U.S. PATENT DOCUMENTS

| | | | |
|---|---|---|---|
| 4,269,482 | 5/1981 | Mori | 359/312 |
| 4,321,564 | * 3/1982 | Tregay | 359/320 |
| 4,788,514 | * 11/1988 | Fox | 359/285 |
| 4,843,335 | 6/1989 | Amano | 332/751 |
| 4,872,746 | * 10/1989 | Kobayashi | 359/312 |
| 5,463,493 | * 10/1995 | Shah | 359/312 |
| 5,712,722 | * 1/1998 | Kump et al. | 359/285 |
| 5,742,425 | * 4/1998 | Kump et al. | 359/285 |
| 6,144,482 | * 11/2000 | Young et al. | 359/305 |

* cited by examiner

*Primary Examiner*—Georgia Epps
*Assistant Examiner*—Saeed Seyrafi
(74) *Attorney, Agent, or Firm*—Greg Leitich

(57) ABSTRACT

An acousto-optic modulator for use with a multi-channel laser beam system, for instance, is of conventional structure except that two different RF (radio frequency) signals drive the modulator. These signals each produce at least one output beam as diffracted by the modulator body. These two beams are angularly and spatially separated. One of the sets of beams is incident upon a beam stop, and therefore is not used for writing. Only the other set of beams, driven by the other of the frequencies, performs the actual writing. The optical stop in addition to blocking one of the sets of diffracted beams also blocks the transmission of the zero order (undiffracted) beam. The sum of the load power of the signals at the two frequencies is kept approximately constant, thereby maintaining a constant thermal condition within the modulator.

12 Claims, 1 Drawing Sheet

THERMALLY BALANCED ACOUSTO-OPTIC MODULATOR

BACKGROUND

1. Field of the Invention

This invention relates to modulation of light beams and more specifically to an improved acoustooptic modulator.

2. Description of the Prior Art

Multi-channel laser beam systems are used, for instance, in laser writing applications, such as imaging patterns onto photo-resist using multiple laser beams for purposes of creating electronic circuit substrates. Such systems employ the well known acousto-optic modulator (AOM). In such a modulator, electrical energy is converted to acoustic waves by a piezoelectric transducer, and the acoustic waves modulate the incident laser (light) beams. The acoustic waves distort the optical index of refraction of the modulator body, which is typically crystalline material or glass, through which the laser beams pass. This distortion is periodic in space and time and thus provides a three dimensional dynamic diffraction grating that deflects or modulates the laser beams. Such acousto-optic devices are well known in broadband signal processing.

An example of such a modulator 10 is shown in FIG. 1A illustrating the exterior of the modulator body 14. The light beam 16 enters from the left surface of the body 14 and passes through the body 14. The horizontal lines are intended to suggest diffraction grating properties; it is to be understood that the molecules in the modulator body, compressed or stretched by the presence of acoustic waves, provide the effect of a three dimensional dynamic phase grating and this is not a conventional diffraction grating.

The electrical input signal ("input") is applied via input electrode 21 to the surface transducer electrode 20 on the modulator body 14. Electrode 20 is made of a thin platelet of piezoelectric material bonded to the surface of the modulator body 14. Electrode 20 also provides acoustic impedance matching. Light beam 16 enters the body 14 through a surface of body 14 orthogonal to the surface to which the piezoelectric electrode 20 is bonded. The frequency and power of this electrical input signal determines to what extent light beam 16 is deflected by passing through modulator body 14 due to the presence of the resulting acoustic wave. Conventionally an acoustic termination such as an acoustic absorber 22 is provided on the surface of the modulator body 14 opposite to the surface on which the electrode 20 is bonded and the electrical signal is applied. Alternatively, the surface of the modulator body opposite to the surface on which electrode 20 is bonded may be cut at an angle causing incident acoustic waves to reflect off-axis and eventually be absorbed by the modulator body.

Thus the electrical connection 21 with electrode 20 and ground electrode 24 is an electrical input port and the voltage (signal) applied thereto creates a spatially uniform electric field in the piezoelectric active regions of electrode 20 to cause the generation of a uniform acoustic wave traveling down the modulator body 14, which in turn, causes the intended deflection of the light beam 16. Due to photoelastic coefficients of the modulator material 14, the actual effect is caused by appreciable variations in the refractive index of the modulator body 14 which in effect creates a moving (dynamic) diffraction grating traveling at the speed of sound with a grating strength determined by the input electrical power. The angle of deflection of the output light beam and its magnitude as produced by the moving diffraction grating depends on the frequency and the amplitude of the acoustic wave.

FIG. 1A shows only a single electrode 20 for modulating a single incident light beam 16. "Light beam" in this context refers to any electromagnetic radiation which may be so modulated, including not only visible light but also ultra-violet light and other frequencies including infra-red, etc., from a laser or other source.

In multi-channel laser beam systems, a plurality of laser (light) beams 16a, 16b, 16c, 16d are incident on a single modulator body (see FIG. 1B). The modulator body 14 has formed on its surface a corresponding number of electrodes 20a, 20b, 20c, 20d, there being one such electrode for each beam 16a, ..., 16d to be modulated. Such a device has a plurality of electrodes 20a, 20b, 20c, 20d on the surface of the modulator body 14. Typically there are 4 or 8 or more such electrodes, each deflecting a corresponding incident beam. The physical size of each electrode can be very small for the case of a high speed modulator array, about a few hundred micrometers by a few millimeters each for modulator bandwidth on the order of tens of megahertz. It is a common practice to form such modulator electrode arrays using conventional photo-lithographic means to define the small electrodes. To provide electrical and acoustic isolation, the electrodes are made with a finite gap in between.

In laser imaging systems the intent is to form an array of tiny laser beam dots, modulated in time, on the imaging medium, the dots having a typical packing density of 300 to 300,000 or more dots per inch. Moving the modulated optical dot array in a direction nominally orthogonal to the dot array orientation, i.e. raster scanning, on an optically sensitive medium produces a recorded image of the modulating signal. Obviously, in order to print a continuous quality pattern, there should be no noticeable gap between adjacent laser beam dots on the optically sensitive medium.

Since the desired laser beam dots tends to be substantially smaller in diameter than the laser beams in the modulator array, optical imaging techniques are employed to reduce the laser beam diameters and to eliminate the gaps between adjacent modulated laser beams from a modulator array.

For adequate efficiency, acousto-optic modulators as described above are typically operated, in terms of power input, at watts or fractions of a watt RF power. RF power refers to the amount of applied electrical power at the input terminal. This power is partly converted into heat near the transducer region and causes pattern dependent thermal gradients in the interaction medium, which is the body of the acousto-optic modulator. Undesirably, these gradients may deflect the incident light beam, or beams, away from the optimal Bragg angle condition and cause the amount of light transmitted to change, depending on the recent modulation state history of the modulator. Pointing of the diffracted light rays coming from the modulator may also be adversely affected.

SUMMARY

In accordance with this invention, operation of an acousto-optic modulator is modified to obtain a constant thermal condition within the modulator body and its electrode layer regardless of the prior modulation levels. Desirably this improves transmission and pointing stability. This is accomplished by driving the modulator using input signals having two different RF frequencies such that the sum of the load power over any given time provided at the two frequencies to the modulator transducer region is at least approximately constant. This need not be exactly the same level of power, but such that over a particular duration of time any pattern (writing pattern) dependent thermal gradients are minimized. Thermal effects occur over time scales of $t=X^2/D$ where D is the thermal diffusivity of electrode body and X is the distance from the electrode interface to the light beam. For a fused silica modulator body, D=0.85 mm$^2$/sec, and typical separations are 0.1 to 1 mm, giving time constants around 1 sec.

The power level of only one of the two signals is modulated in order to print the pattern, and the total power level is constant. An optical stop is provided to block the light output from the modulator which is the zero order undiffracted beam as well as the light diffracted by the modulation at the other of the two frequencies. The two frequencies are chosen so as to provide adequate beam separation and so that the acoustical impedance of the transducer is approximately the same for the two frequencies. This is suitable for use with a single transducer modulator or a multitransducer modulator of the types described above.

DETAILED DESCRIPTION

Figure 1A:
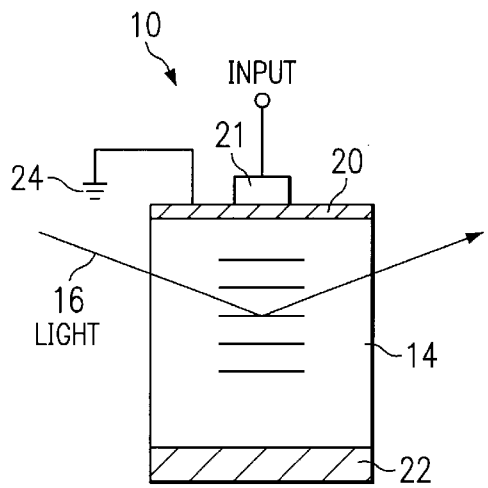
FIG. 1A shows a prior art modulator.
Figure 2:
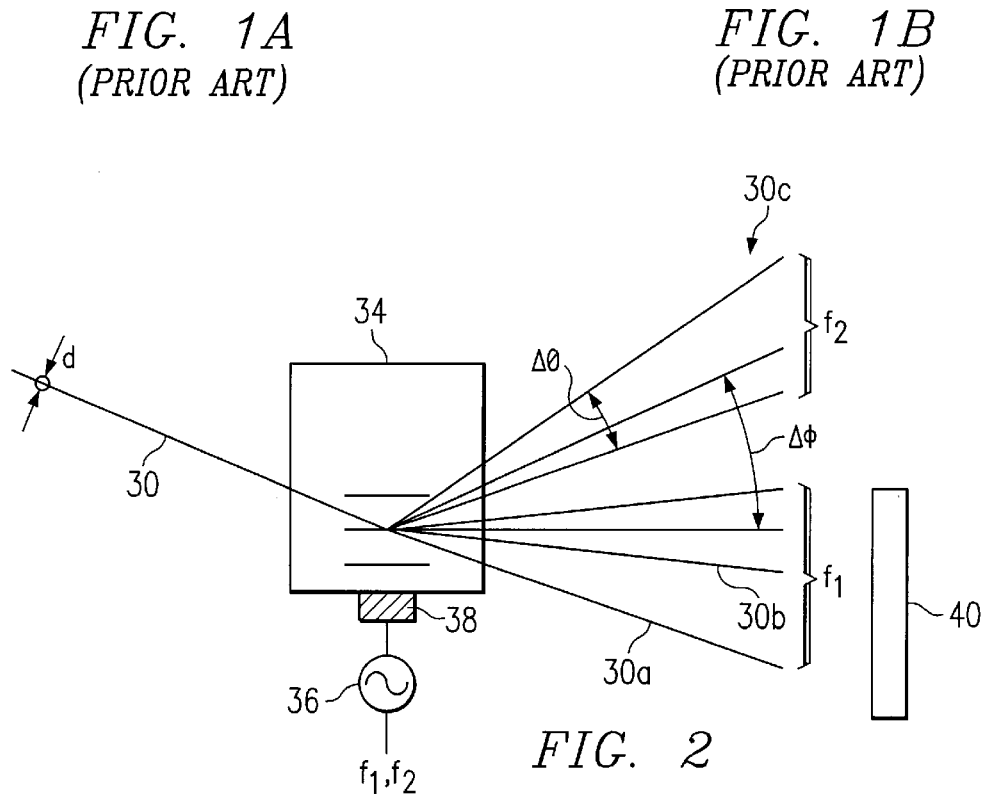
FIG. 2 shows operation of a modulator in accordance with this invention.

FIG. 2 illustrates an incident laser (light) beam 30 having a beam diameter of d at the 1/e$^2$ intensity point, entering the modulator body 34 where it is diffracted by two input signals having respective frequencies f1, f2. These signals f1, f2 are the input RF signals. Application of signals f1, f2 is accomplished by a source 36 which, in turn, is coupled to the conventional input electrode 38 (same as electrode 21 in FIG. 1A). Other, conventional, aspects of this modulator which are not shown for simplicity are as described above and include the transducer electrode, ground connection, and acoustic absorber.

In accordance with the invention, two discrete frequencies, f1 and f2, are applied to drive the modulator, and the beam stop 40 is a structure opaque to the diffracted (and zero order undiffracted) light beams. As seen, the undiffracted beam 30a and the diffracted beam 30b are blocked (outside the modulator 34) by the opaque beam stop 40. The beam (or beams) 30c diffracted by the other driving frequency f2 are used to print the pattern and are therefore not blocked by stop 40.

Figure 3:
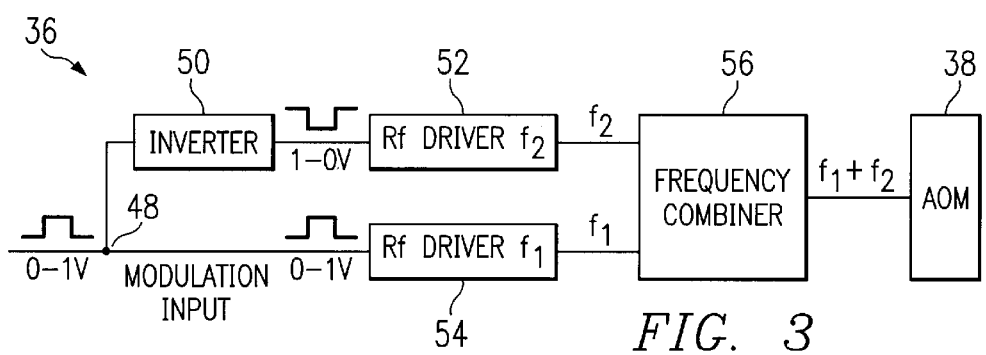
FIG. 3 shows an RF driver circuit in accordance with this invention.

FIG. 3 shows how power to the acousto-optic modulator is maintained constant by one embodiment of an RF driver circuit; this circuit is merely exemplary. The input signal is applied at node 48 and this is the single RF signal which normally would drive the acoustic optic modulator. In this case the RF signal is shown having levels of typically 0 or 1 volt applied at node 48. It is applied to an inverter 50 which outputs an inverted version of that signal to a first RF driver 52 outputting a frequency f2. The signal at node 48 is also applied directly to a second RF driver 54 outputting frequency f1. These two RF drivers 52, 54 provide output signals at frequencies $f_2$ and $f_1$, which in turn are applied to a frequency combiner 56, which drives the input terminal 38 of the modulator as shown. The power levels of the two drivers 52, 54 are adjusted for equal heating affects on the modulator at both 0 volt and 1 volt signal levels.

In accordance with the invention, the two beams (beam sets) diffracted by input signals f1 and f2 are spatially separated enough so as to be readily discriminated by the beam stop, as shown in FIG. 2. This means that one set of beams is not incident on the beam stop 40 and the other set is incident on the beam stop 40. In this case, the angular separation is shown by the angle $\Delta\Phi$.

The following is an example illustrating relationships between relevant parameters in FIG. 2. Of course, this is merely an example and many other parameters are possible. Relationships of the angular beam spread and the spatial separation between the beams are as follows:

$\Delta\theta=4\lambda/\pi d$, where $\Delta\theta$ is the full 1/e$^2$ angular spread of the beam, $\lambda$ is the wavelength of the incident beam and d is the 1/e$^2$ diameter of the laser waist (the diameter of focus) inside the modulator body 34.

$\Delta\Phi=\Delta f\lambda/V$, where $\Delta\Phi$ is the angular separation shown in FIG. 2 between the (central ray of each of the) two sets of diffracted beams and V is the velocity of sound in the modulator body 34 material, and $\Delta f=f2-f1$.

Then $\Delta\Phi/\Delta\theta$ equals the number 1/e$^2$ spots separation between the two diffracted beams so that:

$$\Delta\Phi/\Delta\theta=\pi d\Delta f/4V.$$

For an exemplary multi-channel laser beam system such as the ALTA 3500 commercially available from Etec Systems Inc., the parameters are d=144$\mu$, $\Delta f$=100 MHz, and V=6×10$^9$ $\mu$m per second in fused silica (the modulator body material). Frequency f2 is the nominal 200 MHz carrier frequency, and frequency f1 then is 100 MHz. Of course, these values are merely selected for purpose of illustration.

With these parameters, $\Delta\Phi/\Delta\theta$=1.89, which is large enough to physically separate the two sets of beams 30b, 30c. Note that the intensity of the beam will have fallen to $e^{-2\times1.89^2}$=0.0008 at the edge of the beam stop 40 placed halfway between the center ray of each of the sets of beams 30b, 30c.

Frequency f1 is chosen to be small enough for adequate beam separation with regard to the stop but large enough so that the associated radio frequency matching networks, which couple the radio frequency (signals) into the transducer 38, work properly and the acoustical impedance of the transducer layers is approximately the same for the two frequencies. The Bragg angle of the transducer should be set for frequency f2; it is not important that the optical efficiency of the modulator at frequency f1 is high since the light diffracted by that frequency is blocked anyway by the beam stop and of course, is not used. The overall requirement is to create the same spatial distribution of heat with frequency f1 as with frequency f2 in the body of the acoustic modulator 34.

The goal is to keep the sum of the power dissipated in the modulator electrode region constant. Due to slight differences in impedance and acoustic attenuation at the two frequencies, the sum of RF power delivered to the modulator may deviate somewhat from a constant and still be within the scope of the invention.

Figure 1B:
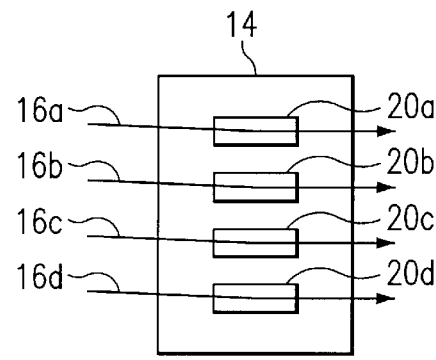
FIG. 1B shows an array of prior art modulators.

This invention may be used with a multi-transducer modulator as described above (see FIG. 1B) and also with binary or gray scale modulation levels as typically used in multi-channel laser beam systems. In another embodiment, the light beams provided by the lower RF frequency input signal are used for writing while (using the beam stop) the beams generated by the higher frequency input signal are blocked.

This disclosure is illustrative but not limiting; further modifications will be apparent to one skilled in the art in light of this disclosure and are intended to fall within the scope of the appended claims.

We claim:

1. An acousto-optic modulator comprising:

a body;

a transducer on a surface of the body;

an input terminal coupled to the transducer for coupling an input signal to the transducer;

wherein, two signals having different frequencies are coupled to the input terminal, thereby causing a light beam incident on a first surface of the modulator to be diffracted into at least two beams output from the modulator body which are spatially and angularly separated; and a beam stop located to block a first diffracted beam output from the modulator body generated in response to a first of said two signals; and wherein a second diffracted beam generated in response to a second of the two signals not blocked by the stop is directed to write onto a medium sensitive to the beam and wherein a beam stop is located also to block an undiffracted light beam output from the modulator body.

2. The modulator of claim 1, wherein the angular separation of the two diffracted beams is proportional to a difference between the first and second frequencies.

3. The modulator of claim 2, wherein the angular separation is further inversely proportional to a velocity of sound in the body of the modulator.

4. The modulator of claim 1, wherein an acoustical impedance of the transducer is approximately the same at the first and second frequencies.

5. The modulator of claim 1, further comprising a plurality of transducers on the modulator, wherein each transducer has an associated input terminal and has signals of at least two frequencies coupled thereto.

6. The modulator of claim 1, wherein a sum of the load power of the two signals is approximately constant.

7. The modulator of claim 1, further comprising a driver circuit coupled to output the two signals, the driver circuit including a first driver and a second driver connected in parallel to a frequency combiner.

8. A method of acoustically modulating a light beam incident on a body, comprising:

directing the light beam through the body;

applying to the body at a single terminal two signals having differing frequencies;

outputting from the body a first diffracted beam responsive to the first signal and a second diffracted beam responsive to the second signal, the first diffracted beam and second diffracted beam being angularly separated;

stopping first diffracted beam and with a beam stop and directing the second diffracted beam onto a medium sensitive to the beam; and stopping an undiffracted light beam after it has passed through the body.

9. The method of claim 8, wherein the angular separation between the beams is proportional to a difference between the two frequencies.

10. The method of claim 9, wherein the angular separation is further inversely proportional to a velocity of sound in the body.

11. The method of claim 8, wherein an acoustical impedance of the body is approximately the same for the two frequencies.

12. The method of claim 8, further comprising maintaining a sum of the power of the two signals approximately constant.

* * * * *